Figure 1:
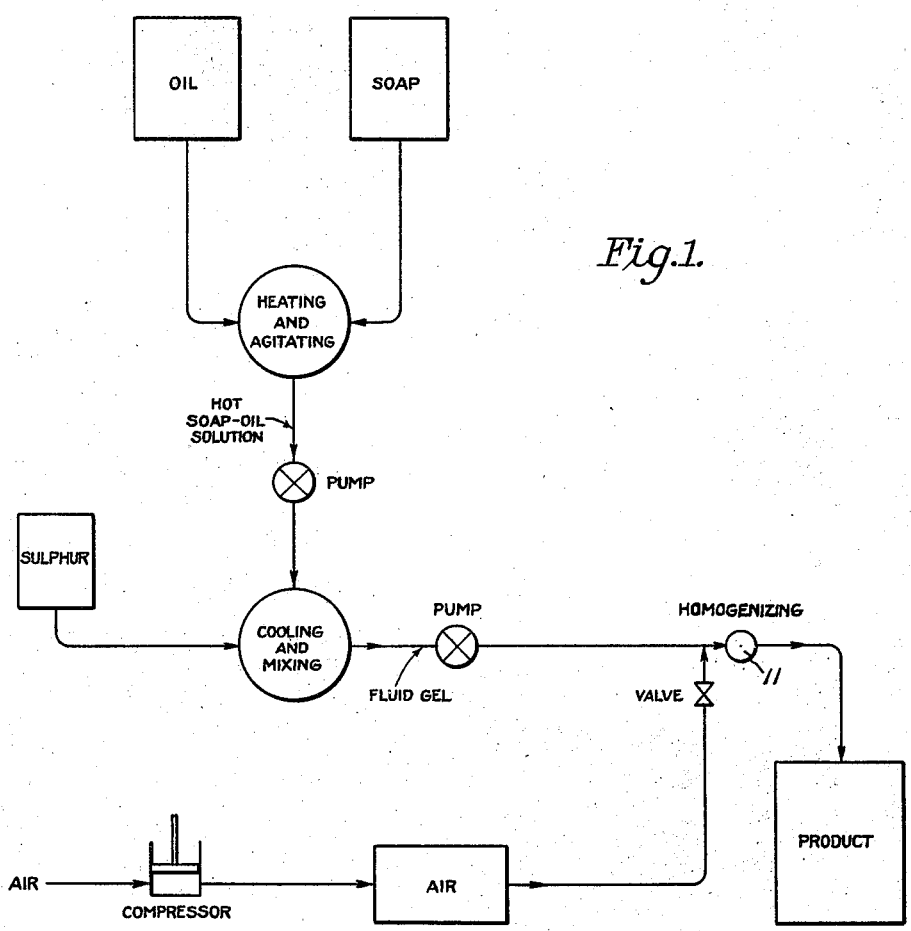

July 2, 1935. V. R. ABRAMS 2,007,137

SUSPENSION FOR LUBRICATION AND OTHER PURPOSES

Filed Nov. 26, 1932

Inventor

VICTOR R. ABRAMS.

By Emery, Booth, Varney & Holcombe
Attorneys

Patented July 2, 1935

2,007,137

UNITED STATES PATENT OFFICE 2,007,137

SUSPENSION FOR LUBRICATION AND OTHER PURPOSES

Victor R. Abrams, Brunswick, Ga., assignor to Sulflo Corporation of America, a corporation of Georgia Application November 26, 1932, Serial No. 644,502

24 Claims. (Cl. 87—9)

My invention relates to an improved lubricant containing stably suspended sulfur particles, or the like, of greater than colloidal size; and also relates to a method for producing such stable suspensions. While my process is intended particularly for the manufacture of such lubricants, it may also be applied generally to the production of stable suspensions of different solid particles of greater than colloidal size in various less dense liquids.

In my co-pending application Serial No. 644,503, filed November 26, 1932 (issued as Patent No. 1,913,300 on June 6, 1933.) I have described a freely flowing cutting lubricant containing finely divided sulfur particles of non-colloidal size (such as flowers of sulfur) stably suspended in a freely flowing gel medium. The powdered sulfur serves as the active lubricating ingredient and is responsible for the marked superiority of my lubricant over all other forms of cutting fluids known to me. As compared with cutting fluids containing dissolved sulfur or chemically combined sulfur, I have found that my lubricant permits metal cutting operations to be speeded up 100% and more and in general results in at least doubling the tool life.

The method for producing the stable suspension of non-colloidal powdered sulfur, as described in my co-pending application, consists, in brief, of the following steps: A mixture of a liquid and a suitable elastic gel-forming material is heated and agitated until the latter is dissolved or completely dispersed throughout the liquid, whereupon it is allowed to cool, without agitation, until a gel is formed. The gel is then vigorously stirred and agitated and the powdered sulfur introduced and distributed therethrough.

When I make use of an oil for the liquid, I may employ as gel-forming materials the soap made from soda or lime and fatty acids, such as sodium oleate; metallic soaps such as aluminum stearate, zinc stearate or zinc oleate; calcium soaps; rosin oil soaps; cup greases (which contain soap) and similar substances. The best soaps are those which are the most insoluble in the oil at room temperatures, such as sodium oleate or other alkali soaps, as the use of soaps slightly soluble in oil causes the product to gradually stiffen and become less freely flowing.

When I make use of water for the liquid, I may employ as gel-forming materials such substances as starch, gums, glue, casein, gelatine, and the like.

My explanation for the ability of the product so produced to contain non-colloidal powdered sulfur in stable suspension, and yet be of such a consistency as to be freely flowing, is as follows: When the liquid containing the gel-forming material in solution or colloidal dispersion is allowed to cool without agitation until a gel is formed, and the latter is then vigorously agitated, the result is a discontinuous gelatinous mass composed of particles of elastic gel in contact with each other and having the interspaces containing a liquid and the sulfur particles distributed between the gel particles and supported thereby. While each gel particle is an amorphous solid, the gelatinous mass will possess the property of fluidity and will flow in the same manner as a homogeneous liquid of low viscosity, and hence may be termed a "fluid gel" or a "freely flowing gel". The sulfur particles after having been distributed throughout the gel mass, will be positioned between the gel particles and will be prevented from settling due to their inability to force the gel particles apart and thus pass downwardly between them. In other words, the sulfur particles are held in suspension mechanically by the gel particles.

While I have stated the theory which I believe accounts for the phenomena observed, I wish in no way to be restricted thereby, but merely present the theory for the assistance it may offer to others in obtaining stable suspensions of the kind described.

In my co-pending application I stated that in many cases a "serum" layer would form which is distinct from the gelatinous mass and which surmounts the latter when the liquid present is less dense than the mean density of the gelatinous mass and included sulfur. This is apparently due to the weight of the sulfur particles, distributed throughout the mass, pressing downward and causing a compression of the gel mass, with the result that a portion of the liquid present (between and within the gel particles) is squeezed out and rises to the surface. The sulfur particles do not settle out, in the sense of forming a separate sulfur layer on the bottom, but remain stably suspended in the gelatinous mass, the whole being merely surmounted by the serum layer which may be easily redistributed by stirring.

The formation of the serum layer is undesirable because it results in a non-uniform lubricant being drawn off from any container in which it has been allowed to stand undisturbed for some time, and thus necessitates some stirring.

I have discovered that sufficient air can be stably dispersed throughout the fluid gel to exert a buoyant effect which will entirely counterbalance the effect of the weight of the sulfur particles in tending to force down and compress the gelatinous mass. In fact, if too much air is incorporated, the gelatinous mass, including the sulfur particles, will have a tendency to rise and thus cause the formation of a serum layer at the bottom of the receptacle. When I refer to the air as "dispersed", I mean that it is distributed in the form of minute bubbles visible to the naked eye or smaller.

As the result of my discovery I have been able to produce a freely flowing lubricant containing powdered non-colloidal sulfur which will be so stable that it can stand indefinitely and yet remain uniform throughout without a bothersome serum layer being formed. Not only may such sulfur particles be so suspended, but all other particles up to and including particles large enough to be visible to the naked eye. The only restriction is that the individual particles must not be sufficiently heavy to prevent their being stably suspended within the gelatinous mass itself. As examples, I have produced uniform suspensions of a powdered emery and carborundum and even finely divided lead.

I have also produced a uniform suspension of finely powdered (non-colloidal) selenium which I have found to possess qualities as a superior cutting lubricant closely comparable to those of my non-colloidal powdered sulfur cutting lubricant.

It will be obvious that any other gas than air may be employed to form the dispersed gas bubbles so long as it is sufficiently non-reactive with and insoluble in the liquid and in the gel-forming material employed, and my invention contemplates such equivalent gases and these are embraced within the term "air" as used in the claims.

The amount of air which should be incorporated in the fluid gel, in order to exactly counterbalance the weight of the suspended particles to prevent them from compressing the gelatinous mass, must obviously be such that the mean density of the air and suspended particles employed will equal the density of the liquid vehicle used. In other words, the total weight of the suspended particles and the air, divided by the total volume which they occupy, must equal the weight of the liquid vehicle per unit volume.

From a practical standpoint the weight of the air may be neglected in computing the volume of air required. The following formulæ result from the above considerations:

$$V_A = \frac{V_S(D_S-D_L)}{D_L} \quad (1)$$

$$V_A = \frac{W_S(D_S-D_L)}{D_S D_L} \quad (2)$$

$$R_A = \frac{R_S(D_S-D_L)}{D_S} \quad (3)$$

Where $V_A$ is the volume of air, $V_S$ the volume of the suspended particles, $W_S$ the weight of the suspended particles, $D_S$ the density of the suspended particles, $D_L$ the density of the liquid vehicle, $R_A$ the percentage by volume of air, and $R_S$ the percentage by weight of the suspended particles.

Formula (1) enables the volume of air required for any given volume of suspended particles to be computed, while Formula (2) enables the volume of air required for any given weight of suspended particles to be computed and Formula (3) enables the percentage by volume of the air (relative to the total volume of the lubricant or mixture) required for any given percentage by weight of suspended particles to be computed.

As an example, consider the case of powdered sulfur (density 2.1) suspended in an oil vehicle (density of oil 0.925). Applying formula (1), the volume of air required for each unit volume of sulfur is 1.27. Applying Formula (2), it will be seen that for each gram of sulfur used, 0.60 c. c. of air will be required. Applying Formula (3), 0.56% by volume of air will be required for each percent by weight of sulfur used.

The foregoing analysis is based upon the assumption that the fluid gel is self-sustaining in the absence of the suspended particles, that is, that no serum layer would be formed except as the result of the compression of the gelatinous mass due to the weight of the particles. This is generally true due to the relatively small difference between the density of the gel particles and the liquid vehicle. In any case where self-compression of the gelatinous mass occurs, this may be compensated for by a small additional amount of dispersed air.

In actual practice, with a particular apparatus for producing agitation of the gel and causing the introduction of air bubbles, the operating conditions would be adjusted by trial until the product was found to contain the computed amount of required air in dispersed or bubble form, and a final adjustment would be made in case it should be found that too much or too little air was being used to prevent the formation of a serum layer upon long standing of the product.

Although variations in temperature and pressure conditions to which the product is exposed will affect somewhat the densities of the liquid ingredients and the relative volume of the entrained air bubbles, thus slightly affecting the buoyant effect of the air, by my method such formation can be substantially prevented for one set of conditions and greatly minimized for generally prevailing conditions. In practice, the amount of air dispersed in the fluid-gel would be such that a substantially perfect balance and lack of serum layer formation would be secured for the usual conditions prevailing—whatever might be determined upon as "normal"—, fluctuations about such "normal" conditions resulting only in the formation of a temporary slight serum layer on the top or bottom.

A certain amount of the air or equivalent gas introduced into the fluid-gel will be dissolved in and/or chemically combined with the gel and liquid. It is evident, therefore, that a sufficient amount of air must be introduced so that the amount present in the form of dispersed air bubbles in the final product will equal that required to produce the desired buoyant effect. Hence when I speak of the amount of dispersed air to be introduced to produce a balanced condition, I refer to the amount of air over and above that which will be absorbed.

Upon long standing of the product it will be found that a slight serum layer will gradually be formed, due to the slightly unbalanced condition resulting from the gradual absorption of the dispersed air bubbles initially present in the product. This absorption is small, however, and it has been found that, even after six months of undisturbed standing, the serum layer will be quite small in proportion to the total volume of fluid-gel.

In some cases it may not be thought necessary to secure the greatest possible minimization of serum layer formation, or to accurately control the volume of air dispersed in the fluid gel, and hence when I characterize my method as one by which the formation of a serum layer can be minimized, I mean that the formation of a serum layer can be substantially prevented or minimized to whatever extent is desired.

Figure 2:
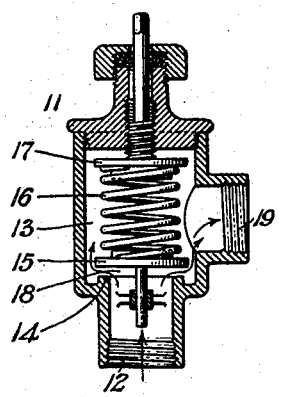

In the accompanying drawing, wherein I have shown for purposes of illustration one embodiment of means for carrying out my invention, Fig. 1 is a flow sheet diagram showing a batch method; and Fig. 2 shows a central vertical section of the check valve represented in Fig. 1.

The method used for obtaining uniform stable suspensions of finely divided particles in liquid vehicles will first be illustrated by describing a preferred method for compounding a freely flowing cutting lubricant containing flowers of sulfur suspended in mineral oil by means of a soap.

The cutting lubricant is made up to contain .5% by weight of flowers of sulfur, and in order that the particles will be supported by the gelatinous mass, 1% by weight of sodium oleate is used as the gel-forming material. The balance comprises 93½% by weight of No. 4 fuel oil (20°-22° Bé. gravity overhead distillate). By applying Formula (3) it will be found that the final product must contain 2.8% of air, by volume, in order to prevent the formation of a serum layer.

Referring to Fig. 1, the necessary amounts of the oil and the sodium oleate are introduced into a heating and agitating tank where they are heated together (as by steam coils) to a temperature of 160° C., or higher, and agitated (as by a propellor type stirrer) until complete solution is effected.

The hot sodium oleate and oil solution is then pumped (as by a rotary liquid transfer pump) into a cooling tank equipped with water cooled surfaces. The solution is allowed to cool, without agitation, until a gel is formed, the gel point being about 110°-120° C. While I have found that best results are secured by avoiding agitation at this point, it will be apparent that the formation of a gel is what is desired and any procedure can be used which will not prevent this. Hence when I speak of cooling "without agitation", I merely mean without sufficient agitation or disturbance to prevent the formation of the desired gel. The gel point is not definite and need not be determined, the important thing, to secure best results, being simply to strictly avoid any agitation and cool until a complete gel is formed. The gel mass is further cooled as desired and then the correct amount of flowers of sulphur introduced. The mixture is thoroughly stirred so as to distribute the sulfur with fair uniformity throughout the gelatinous mass, and to simultaneously break up the gel so that it will flow through a pipe.

In order to disperse the required amount of air throughout the gelatinous mass and admixed flowers of sulfur so as to form the lubricant product, I employ the method of pumping under pressure the gelatinous mass, admixed sulfur, and air, through an orifice, thereby causing a breaking up of the gel into minute gel particles and a thorough intermingling and breaking up the air into minute bubbles dispersed uniformly throughout the mixture. As a result of this procedure the sulfur particles will be simultaneously distributed uniformly throughout the mixture.

As a preferred form of orifice I employ an ordinary check valve (11), such as illustrated in Fig. 2. In this example, the valve has an inlet (12) which is two inches in diameter and which projects into the valve chamber (13), having a peripheral flange forming a valve seat (14). Against this is pressed a valve disk (15), forced against the seat by means of a spring (16) compressed by an adjustable follower (17) and set to exert the required pressure. When the liquid mixture is pumped into the valve, through the inlet, at a sufficient pressure to cause it to flow through the valve, the valve disk will be forced away from its seat and a ring shaped orifice (18) will be formed. The advantage of this type of orifice over an ordinary fixed jet-orifice is that clogging is less apt to occur. As the orifice becomes clogged, by deposition of material on the valve seat and upon the valve disk, the disk will automatically move away from the seat so as to maintain the orifice and will also permit the material deposited to be washed away, the disk being automatically maintained at the correct distance from the seat. The liquid mixture leaves the check valve by outlet (19).

Referring again to Fig. 1, the gelatinous mass and admixed sulfur is pumped to the inlet of the check valve. An air compressor maintains a compressed air tank at a greater pressure than that at which the check valve is set. The air is then passed through a pipe, controlled by a regulating valve, such as a needle valve, and connects with the inlet of the check valve. By regulating the air valve, the correct amount of air can thus be introduced into the mixture of sulfur and fluid gel flowing into the check valve.

I have found that when the check valve is set at fifty pounds, and the mixture of sulfur and fluid gel is pumped in through a two inch pipe from the pump at a pressure sufficient to cause the valve disk to be separated from its seat by a distance of 0.01 inch, the velocity increase of the mixture will be in the neighborhood of eighty feet per second and this, together with the size of the orifice, will cause the air introduced into the gelatinous mass to be thoroughly and uniformly dispersed therethrough in the form of minute bubbles which remain uniformly and stably distributed. The gelatinous mass will be rendered of uniform consistency and the sulfur particles will be uniformly distributed therein. The total mixture, or product, will be freely flowing.

The product leaving the check valve by the outlet is piped to a storage tank, where it may be further stirred if desired. The product may also be recycled through the check valve, with or without the further addition of air.

The setting of the regulating valve in the air line may be adjusted by trial to cause the correct amount of air to be introduced into the mixture at the check valve inlet, so that the product (prepared according to this example) will contain the desired 2.8% by volume of dispersed air. This is a simple matter and only requires that the increase in volume of the product over the volume of the gelatinous mass and admixed sulfur be determined and the air valve be adjusted so that this will have the proper value.

It will be obvious that the pressure at which the check valve is set, and the rate at which the mixture may be pumped into the check valve inlet, may vary considerably, the only requirement being that the air be uniformly distributed throughout the product in the form of minute bubbles. I have described a particular type and size of check valve, but it is obvious that this is a matter of selection only and that any arrangement may be used which will produce the effect described of producing a uniform stable product.

Other methods of introducing and dispersing air may be used. For example, the gelatinous mass and admixed sulfur can be agitated or beaten until the required amount of air has been distributed and dispersed therethrough.

The preparation of the particular product described may be readily modified so that a lubricant will be obtained which will contain powdered sulfur in any amount desired, from an upper limit at which the product will no longer be freely flowing down to a lower limit at which the sulfur will not be present in sufficient amount to function as an adequate lubricant. I have found that at least 40%, by weight, of sulfur may be used and that a sulfur content of less than 1% will permit the product to be used satisfactorily for the lubrication of hand-operated dies or wherever lubricating conditions are not severe. The sodium oleate content should be adjusted so that the gel will support the sulfur, about 3% being adequate when 40% of sulfur is used. The amount of air required to prevent the formation of a serum layer, for any given sulfur content, may be easily determined by trial or computed according to the formulæ already stated.

The same procedure may obviously be used when other soaps than sodium oleate are employed and may also be used to obtain uniform suspensions in a water vehicle or in other liquid vehicles, a suitable gel-forming material being employed in each case.

For example, cutting lubricant containing 5%, by weight, of flowers of sulfur stably and uniformly suspended in water may be prepared by using 2%, by weight, of starch as the gel-forming material and incorporating 2.6% by volume of air.

The sulfur lubricant which I have described, while of especial utility in the cutting of metals, may be used generally as a lubricant and will be valuable for many types of work where extreme pressures (and necessarily high local temperatures) are encountered, as in die pressing, wire drawing, and for lubricating hypoid gears.

The method for preparing stable and uniform suspensions may be used for preparing a variety of other products containing different particles.

A selenium lubricant may be prepared in the same manner as the sulfur lubricant and will have a closely comparable utility for the same purpose. For example, 10%, by weight, of powdered selenium of non-colloidal size may be suspended in a thin mineral oil vehicle by the use of 1½%, by weight, of sodium oleate and 8.1%, by volume, of dispersed air.

A grinding compound containing 15% of powdered carborundum of non-colloidal size may be suspended in a thin mineral oil by the use of 1½%, by weight, of sodium oleate and 10.6%, by volume, of dispersed air.

A grinding compound containing 15% of powdered emery of non-colloidal size may be suspended in a thin mineral oil by the use of 1½%, by weight, of sodium oleate and 11.3%, by volume, of dispersed air.

The air percentages which I have stated throughout, where an oil vehicle is employed, have been computed on the assumption of an oil of 0.92 specific gravity. For oils of different density, a slightly different amount of air will be required, but this may readily be computed from the formulæ given and in any case may be readily ascertained by trial.

It will be evident that my method relates to a general process for producing stable, uniform suspensions of particles in less dense liquid vehicles, and while I have given certain examples by way of illustration, I do not intend to be in any way limited thereby, either as to method or product, but what I claim is as follows.

1. The method of preparing a stable freely flowing lubricant containing stably suspended powdered sulfur of greater than colloidal size, comprising heating and mixing together a liquid vehicle and a small amount of a suitable elastic-gel-forming material until solution is effected, cooling the solution and allowing a gel to be formed, distributing the powdered sulfur throughout the gel by mixing together, and dispersing sufficient air throughout the mixture to substantially minimize the formation of a serum layer, said gel-forming material being in sufficient amount to provide a gel which will stably suspend said powdered sulfur.

2. The method of preparing a stable freely flowing lubricant containing stably suspended powdered sulfur of greater than colloidal size, comprising heating and mixing together an oil vehicle and a small amount of a suitable elastic-gel-forming material until solution is effected, cooling the solution and allowing a gel to be formed, distributing the powdered sulfur throughout the gel by mixing together, and dispersing sufficient air throughout the mixture to substantially prevent the formation of a serum layer, said gel-forming material being in sufficient amount to provide a gel which will stably suspend said powdered sulfur.

3. The method of preparing a stable freely flowing lubricant containing stably suspended powdered sulfur of greater than colloidal size, comprising heating and mixing together a water vehicle and a small amount of a suitable elastic-gel-forming material until solution is effected, cooling the solution and allowing a gel to be formed, distributing the powdered sulfur throughout the gel by mixing together, and dispersing sufficient air throughout the mixture to substantially prevent the formation of a serum layer, said gel-forming material being in sufficient amount to provide a gel which will stably suspend said powdered sulfur.

4. The method of preparing a stable freely flowing lubricant containing powdered sulfur of greater than colloidal size, comprising heating a mineral mixing together an oil vehicle and about 1% of sodium oleate soap until solution is effected, cooling the solution without substantial agitation until a gel is formed, distributing about 5% of powdered sulfur throughout the gel by mixing together, and dispersing sufficient air throughout the mixture to substantially prevent the formation of a serum layer.

5. The method of preparing a stable freely flowing lubricant containing powdered sulfur of greater than colloidal size, comprising heating and mixing together water and about 2% of starch until solution is effected, cooling the mixture without substantial agitation until a gel is formed, distributing about 5% of powdered sulfur throughout the gel by mixing together, and dispersing sufficient air throughout the mixture to substantially prevent the formation of a serum layer.

6. The method of preparing a stable freely flowing grinding compound comprising heating and mixing together a liquid vehicle and a small amount of a suitable elastic-gel-forming material until solution is effected, cooling the solution and allowing a gel to be formed, distributing a powdered abrasive of greater than colloidal size and greater density than said liquid vehicle throughout the gel by mixing together, and dispersing sufficient air throughout the mixture to substantially minimize the formation of a serum layer, said gel-forming material being in sufficient amount to provide a gel which will stably suspend said abrasive.

7. A freely flowing stable gel composition comprising a discontinuous fluid gel containing solid particles of greater density and of greater than colloidal size suspended therein and sufficient air dispersed therethrough to substantially minimize the formation of a serum layer.

8. A freely flowing stable gel composition comprising a discontinuous fluid gel containing solid particles of greater density and of greater than colloidal size suspended therein, and sufficient air dispersed therethrough in the form of minute entrapped bubbles to substantially counterbalance the weight of said solid particles and thereby substantially prevent the formation of a serum layer.

9. A freely flowing lubricant comprising a discontinuous fluid gel containing a powdered solid lubricant of greater than colloidal size suspended therein, said solid lubricant being denser than the medium in which suspended, and having sufficient air dispersed therethrough to substantially prevent the formation of a serum layer.

10. A freely flowing lubricant comprising an oil vehicle gelled with a small amount of an elastic-gel-forming material and containing a powdered solid lubricant of greater than colloidal size suspended therein, said solid lubricant being denser than the medium in which suspended, and having sufficient air dispersed therethrough to substantially prevent the formation of a serum layer.

11. A freely flowing lubricant comprising a water vehicle gelled with a small amount of an elastic-gel-forming material and containing a powdered solid lubricant of greater than colloidal size suspended therein, said solid lubricant being denser than the medium in which suspended, and having sufficient air dispersed therethrough to substantially prevent the formation of a serum layer.

12. A freely flowing lubricant comprising a liquid vehicle gelled with a small amount of a suitable elastic-gel-forming material, powdered sulfur of greater than colloidal size distributed therethrough in sufficient amount to function as a lubricating ingredient and be stably suspended therein, and sufficient air dispersed therethrough to substantially prevent the formation of a serum layer.

13. A freely flowing grinding compound comprising a liquid vehicle gelled with a small amount of a suitable elastic-gel-forming material, a powdered abrasive of greater than colloidal size and of greater density than said liquid vehicle distributed therethrough in sufficient amount to function as a grinding ingredient and be stably suspended therein, and sufficient air dispersed therethrough to substantially minimize the formation of a serum layer.

14. A lubricant freely flowing at ordinary temperatures comprising a liquid vehicle gelled with a small amount of a suitable elastic-gel-forming material, powdered sulfur of greater than colloidal size distributed therethrough in sufficient amount to function as a lubricating ingredient and be stably suspended therein, and sufficient air dispersed therethrough to substantially prevent the formation of a serum layer.

15. A lubricant freely flowing at ordinary temperatures comprising a water vehicle gelled with a small amount of a suitable elastic-gel-forming material, powdered sulfur of greater than colloidal size distributed therethrough in sufficient amount to function as a lubricating ingredient and be stably suspended therein, and sufficient air dispersed therethrough to substantially prevent the formation of a serum layer.

16. A freely flowing lubricant comprising a mineral oil vehicle gelled with about 1% of sodium oleate soap and having about 5% of powdered sulfur of greater than colloidal size distributed therethrough and stably suspended therein, and sufficient air dispersed therethrough to substantially prevent the formation of a serum layer.

17. A freely flowing lubricant comprising a water vehicle gelled with about 2% of starch and having about 5% of powdered sulfur of greater than colloidal size distributed therethrough and stably suspended therein, and sufficient air dispersed therethrough to substantially prevent the formation of a serum layer.

18. The method of preparing a freely flowing gel containing stably suspended solid particles of greater than colloidal size and denser than the medium in which suspended, comprising heating and mixing together a liquid vehicle and a small amount of a suitable elastic-gel-forming material until solution is effected, cooling the solution and allowing a gel to be formed, distributing said particles throughout the gel and agitating to form a discontinuous gel mixture, and dispersing sufficient air throughout the mixture to substantially minimize the formation of a serum layer, said gel-forming material being in sufficient amount to provide a gel which will stably suspend said particles.

19. The method of preparing a freely flowing gel containing stably suspended solid particles of greater than colloidal size and denser than the medium in which suspended, comprising heating and mixing together an oil vehicle and a small amount of a suitable elastic-gel-forming material until solution is effected, cooling the solution and allowing a gel to be formed, distributing said particles throughout the gel and agitating to form a discontinuous gel mixture, and dispersing sufficient air throughout the mixture to substantially minimize the formation of a serum layer, said gel-forming material being in sufficient amount to provide a gel which will stably suspend said particles.

20. The method of preparing a freely flowing gel containing stably suspended solid particles of greater than colloidal size and denser than the medium in which suspended, comprising heating and mixing together a water vehicle and a small amount of a suitable elastic-gel-forming material until solution is effected cooling the solution and allowing a gel to be formed, distributing said particles throughout the gel and agitating to form a discontinuous gel mixture, and dispersing sufficient air throughout the mixture to substantially minimize the formation of a serum layer, said gel-forming material being in sufficient amount to provide a gel which will stably suspend said solid particles.

21. The method of substantially preventing the formation of a serum layer on a discontinuous fluid-gel containing stably suspended denser solid particles of greater than colloidal size distributed therethrough, comprising dispersing air throughout said fluid-gel in the form of minute bubbles entrapped therein and in sufficient amount to substantially counterbalance the weight of said particles.

22. The method of preparing a stable freely flowing lubricant containing a stably suspended powdered solid lubricant of greater than colloidal size and denser than the medium in which suspended, comprising heating and mixing together a liquid vehicle and a small amount of a suitable elastic-gel-forming material until solution is effected, cooling the solution and allowing a gel to be formed, distributing the powdered solid lubricant throughout the gel by mixing together, and dispersing sufficient air throughout the mixture to substantially minimize the formation of a serum layer, said gel-forming material being in sufficient amount to provide a gel which will stably suspend said powdered solid lubricant.

23. The method of preparing a stable freely flowing lubricant containing a stably suspended powdered solid lubricant of greater than colloidal size and denser than the medium in which suspended, comprising heating and mixing together an oil vehicle and a small amount of a suitable elastic-gel-forming material until solution is effected, cooling the solution and allowing a gel to be formed, distributing the powdered solid lubricant throughout the gel by mixing together, and dispersing sufficient air throughout the mixture to substantially prevent the formation of a serum layer, said gel-forming material being in sufficient amount to provide a gel which will stably suspend said powdered solid lubricant.

24. The method of preparing a stable freely flowing lubricant containing a stable suspended powdered solid lubricant of greater than colloidal size and denser than the medium in which suspended, comprising heating and mixing together a water vehicle and a small amount of a suitable elastic-gel-forming material until solution is effected, cooling the solution and allowing a gel to be formed, distributing the powdered solid lubricant throughout the gel by mixing together, and dispersing sufficient air throughout the mixture to substantially prevent the formation of a serum layer, said gel-forming material being in sufficient amount to provide a gel which will stably suspend said powdered solid lubricant.

VICTOR R. ABRAMS.

CERTIFICATE OF CORRECTION.

Patent No. 2,007,137.  July 2, 1935.

VICTOR R. ABRAMS.

It is hereby certified that error appears in the printed specification of the above numbered patent requiring correction as follows: Page 4, second column, line 55-56, claim 4, for "a mineral" read and; and in the same line 56, for "an" read a mineral; and that the said Letters Patent should be read with these corrections therein that the same may conform to the record of the case in the Patent Office.

Signed and sealed this 13th day of August, A. D. 1935.

Leslie Frazer (Seal)  Acting Commissioner of Patents.